United States Patent [19]
Whitlow et al.

[11] Patent Number: 4,927,992
[45] Date of Patent: May 22, 1990

[54] ENERGY BEAM CASTING OF METAL ARTICLES

[75] Inventors: Graham A. Whitlow, Murrysville; Gerald J. Bruck, Library; James E. Smith, Delmont Boro, all of Pa.

[73] Assignee: Westinghouse Electric Corp., Pittsburgh, Pa.

[21] Appl. No.: 21,856

[22] Filed: Mar. 4, 1987

[51] Int. Cl.⁵ .............................................. B23K 26/00
[52] U.S. Cl. ........................... 219/121.65; 219/121.84; 419/5; 419/6
[58] Field of Search .................. 219/121 LE, 121 LF, 219/121 LC, 121 LD, 121 L, 121 LM, 121.65, 121.66, 121.63, 121.64, 121.6, 121.85, 121.84; 427/53.1; 419/5, 8; 156/62.2

[56] References Cited

U.S. PATENT DOCUMENTS

| | | | |
|---|---|---|---|
| 4,000,392 | 12/1976 | Banas et al. | 219/121 LM |
| 4,125,926 | 11/1978 | Gale et al. | 219/121 LM X |
| 4,218,494 | 8/1980 | Belmondo et al. | 219/121 LF X |
| 4,233,720 | 11/1980 | Rozmus | 29/407 |
| 4,323,756 | 4/1982 | Brown et al. | 219/121 LF |
| 4,474,861 | 10/1984 | Ecer | 219/121 LE |
| 4,575,330 | 3/1986 | Hull | 425/174.4 |
| 4,585,619 | 4/1986 | Westin | 419/28 |
| 4,730,093 | 3/1988 | Mehta et al. | 219/121.65 |
| 4,752,352 | 6/1988 | Feygin | 428/548 X |

OTHER PUBLICATIONS

Shape Welding: A New Concept in Fabrication, IRON AGE, Nov. 23, 1981 by Robert R. Irving.

*Primary Examiner*—C. L. Albritton

[57] ABSTRACT

Near net shape metal articles are cast from powder feedstock using a focused high energy beam which melts successive layers of powder as it repetitively traces the shape of the article over a substrate without the necessity for refocusing. Powder is fed into a cavity in which the article is formed at a rate to maintain a depth which provides lateral support for, and therefore forms a mold for, a thick layer of powder which is melted by the energy beam to add each layer to the article. The high energy laser or electron beam has a power density sufficient to penetrate the melted layer of powder and melt the surface of the underlying substrate or layer just enough to provide a good metallurgical bond for the layer being added. A copper fixture which supports the substrate while the article is being formed, serves as a heat sink and forms the cavity which confines the powder to the vicinity of the article being formed. Various shapes can be cast through selected programming of the repetitive pattern of relative motion between the energy beam and the substrate.

14 Claims, 4 Drawing Sheets

ENERGY BEAM CASTING OF METAL ARTICLES

BACKGROUND OF INVENTION

1. Field of the Invention

This invention relates to near net shape casting of metal articles by utilizing a focused high energy beam to melt successive layers of powder feedstock onto a substrate. Rapid build up of the article is achieved by forming a mold from the powder metal to laterally support a thick layer of the powder melted on each pass.

2. Background Information

The conventional practice of melting and casting of metals and alloys frequently encompasses considerable expenditures in time and materials for preparation of the necessary casting molds and/or dies. In many cases, cast products are then machined to final dimensions which incurs additional costs. Furthermore, some alloys are very difficult and therefore costly, to machine. In some instances, due to mold and/or die deterioration, the number of cast parts obtainable from a given set of fixturing may be limited, which also increases costs.

Recently, innovative advances have led to the development of processes for producing so-called near net shape parts, which offer advantages in minimization of post-casting operations. Some of these procedures still require casting, but involve molding powdered metal to more precise shapes. Other techniques include building up bulk metal products such as cylinders by applying successive layers of metal using conventional welding techniques.

U.S. Pat. No. 4,323,756 teaches a method of producing near net shape metallic articles by depositing multiple thin layers of wire or powder metal feedstock to a substrate using a high energy laser beam or electron beam. An essential feature of the process of this patent is that the volume of substrate melted on each pass exceeds the volume of melted powder metal added, such that each layer is melted at least twice, which is said to improve the metallurgical structure of the finished article. The maximum thickness of layers added by this process is said to be 0.005 inches so that hundreds or even thousands of layers are added to form the finished product.

A primary object of the present invention is to provide apparatus and a process for making near-net shape articles from powder metal which can be built up rapidly.

Another object of the invention is to provide such an apparatus and method which utilize the powder metal itself to form a mold which provides lateral support for the thick layers of powder metal required for rapid build up of the article.

Yet another object of the invention is to provide such an apparatus and method which provides for the removal of heat generated by the energy beam from the substrate on which the article is formed.

Still another object of the invention is to provide a method by which articles built up from layers of melred powder metal can be separated from the substrate on which they are formed.

SUMMARY OF THE INVENTION

These and other objects are realized by the invention in which a focused energy beam with a power density sufficient to melr powder metal repetitively traces over a substrare the shape of the article to be formed. Powder metal is fed onto the substrate at a rate to maintain a depth of powder metal which provides lateral support for and forms a mold for, a layer of powder metal at the energy beam interface which is melted by the energy beam. The thickness of this layer is such that the energy beam penetrates the powder metal and melts the surface of the substrate, but only to the extent to wet the substrate sufficiently to bond the melted powder metal to the substrate. After interacting with the energy beam, the relatively thick melted layer of powder metal cools rapidly, solidies and becomes the substrate for the next layer. With this technique, layers in excess of 0.01 inches, and preferably 0.03 to 0.05 inches can be laid down to rapidly build up the article from powder metal.

A guide member, having an opening through which the energy beam passes, forms with the substrate a cavity in which the article is formed, and which confines the powder metal to maintain the desired depth at the energy beam interface to build up the thick layers necessary for rapid formation of the article. Preferably, the guide member is part of a fixture which supports the substrate and forms a heat sink for conducting heat generated by the energy beam away from the substrate to prevent it from warping.

In many instances the article formed by the invention is intended to remain integral with the substrate. If desired, however, the article can be separated from the base substrate after it has been formed, such as by cutting it free. Alternatively, a thin base substrate of the same material as the powder metal can be secured to a support member during formation of the article. When the article is completed, the substrate is separated from the support member, and then removed from the article, such as by milling.

The energy beam, which may be a laser beam or an electron beam, is focused before or beyond the surface of the base substrate such that the article is formed by the unfocused portion of the beam. The power density of the unfocused portion of the beam remains high enough to melt the powder metal over a sufficient distance that the beam does not have to be refocused during formation of the article.

The invention encompasses both the method and apparatus for forming articles of powder metal.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The invention is directed to producing metallic articles by building up successive layers of the article from powder metal using a focused laser or electron beam to melt the powder metal and fuse each successive layer to the layer below. Rapid build up is achieved by feeding powder metal into the interface between the energy beam and previously laid down layers of the article to a depth up to the maximum depth which can be melted by the beam and fused to the underlying layer. Lateral support for such a deep layer of powder metal is provided by filling a cavity surrounding the article to be cast with powder metal to the desired level. The powder metal adjacent the focused beam is not affected by the concentrated energy of the beam, but forms in effect a mold for the article being formed.

Figure 1:
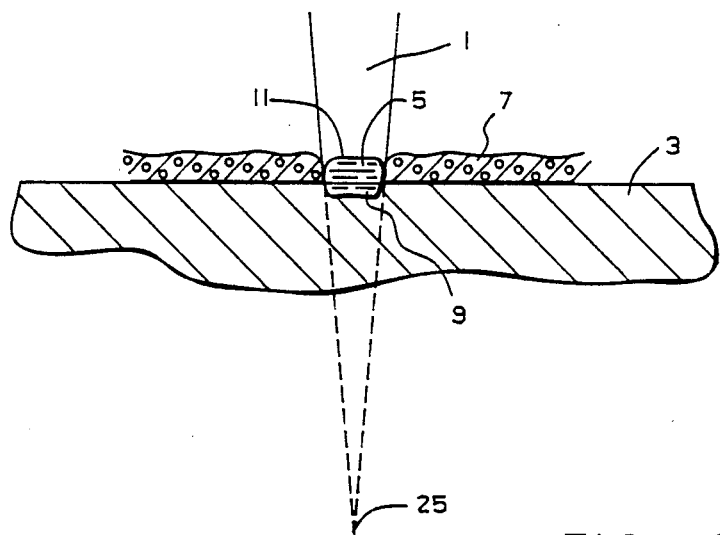
FIGS. 1 and 2 are schematic vertical sections through an article produced in accordance with the invention shown at two different stages in its formation.

As shown in FIG. 1, a focused energy beam 1 is directed at the surface of a base substrate 3. The energy beam melts the portion 5 of a layer 7 of powder metal overlaying the base substrate 3. The energy beam has a sufficient energy density to penetrate the layer of powder metal 5 and melt the surface 9 of the substrate 3. The substrate is only melted to a depth sufficient to key in with the deposit of molten powder metal 5. Thus, the volume of substrate 9 melted by the energy beam 1 is less than the volume of molten powder metal 5. This minimizes dilution of the alloy of the molten powder metal 5. The height of the layer 5 is somewhat less than the thickness of the layer of powder metal 7 due to the difference in densities of the powder metal 7 and the modern metal 5.

Through relative movement between the substrate 3 and the energy beam 1 the molten powder metal 5 moves out of the beam path 11 and cools rapidly to solidify into the first layer of the article being formed.

Figure 2:
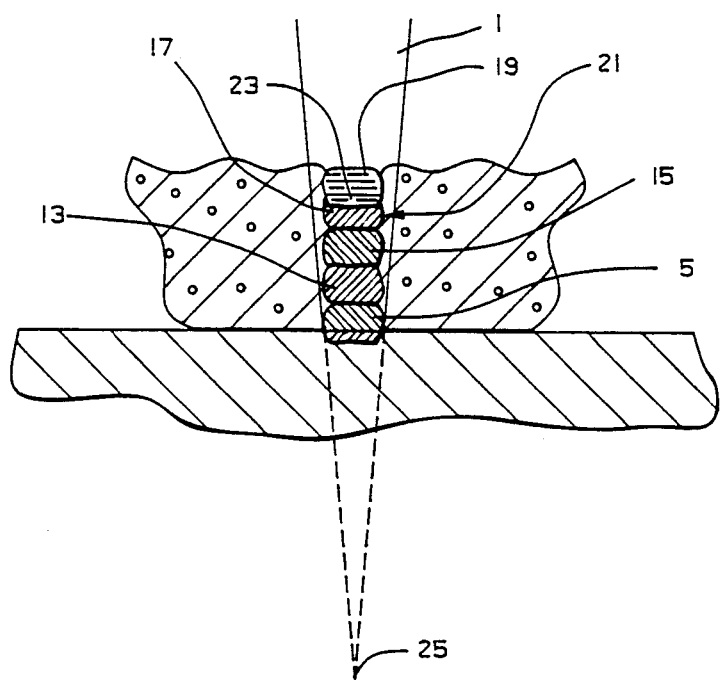

Relative movement between the energy beam 1 and substrate 3 is such that the energy beam repetirively traces the shape of the article over the substrate. On subsequent passes, the level of the powder metal 7 is increased to maintain the desired thickness of the layer of the powder metal at the interface with energy beam 1. As shown in FIG. 2 additional layers 13, 15, 17 and 19 are built up on top of the initial layer 5 to form the article 21. The thickness of these additional layers is such that the energy beam 1 melts the fresh layer of powder metal as at 19 and the top surface only 23 of the preceding layer 17 to fuse the newest layer 19 to the preceding layer.

As shown in both FIGS. 1 and 2 the energy beam is focused at a focal point 25 which is beyond the surface of the substrate 3 on which the article 21 is formed. Thus, the article 21 is formed in the defocused portion of the beam 1. However, the energy density of the beam remains high enough that multiple layers, and preferably the entire article, can be built up without a change in the focus of the beam. While the beam interface increases in area with each layer added to the article, the article does not expand in width because the surface tension of the wetted preceding layer maintains the dimensions of the article. The convergence of the beam is exaggerated in FIGS. 1 and 2 to illustrate the effect of the defocused beam 1. In the exemplary embodiments of the invention, the angle of convergence was about 8 degrees. Articles up to one half inch in height were formed with the focal point 25 located one-half inch below the surface of the substrate 3 without adjusting the focus.

Figure 3:
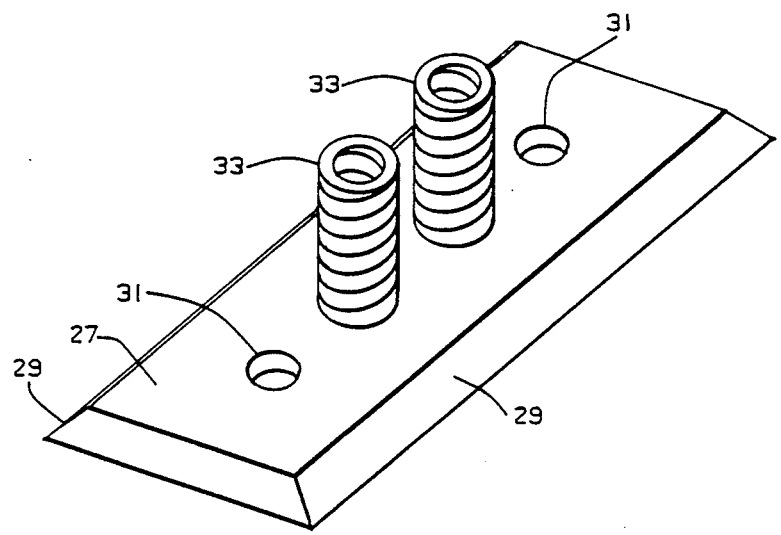
FIG. 3 is an isometric view of exemplary articles formed on a substrate in accordance with the teachings of the invention.

FIG. 3 illustrates exemplary articles formed by the invention. The substrate is a flat steel bar 27 with beveled side edges 29 and a series of bores 31. Cylindrical bosses 33 were built up around each of the bores 31 using the invention.

Figure 4:
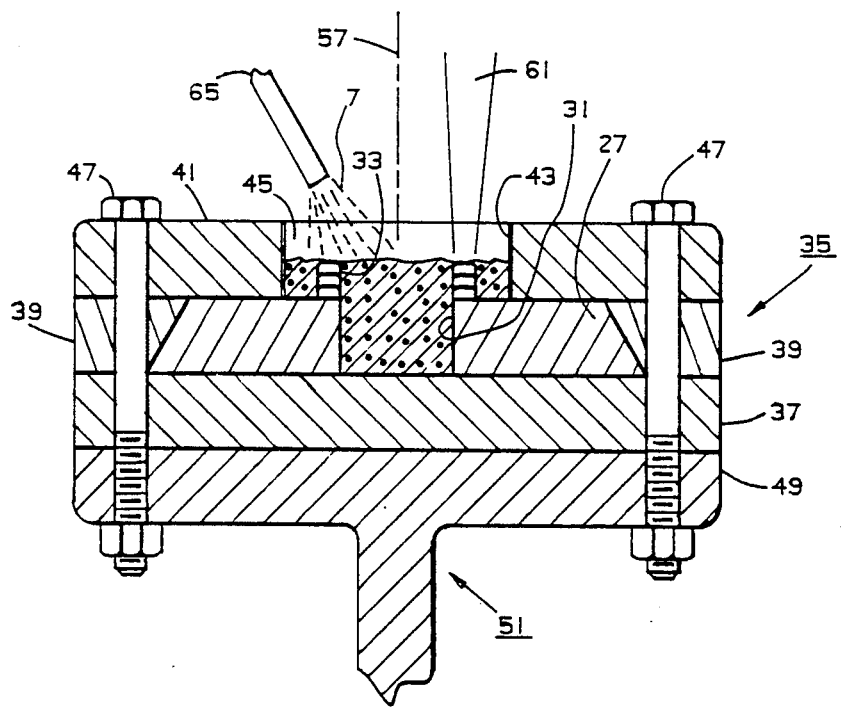
FIG. 4 is a transverse section through a fixture in accordance with the invention used to form the articles illustrated in FIG. 3.
Figure 5:
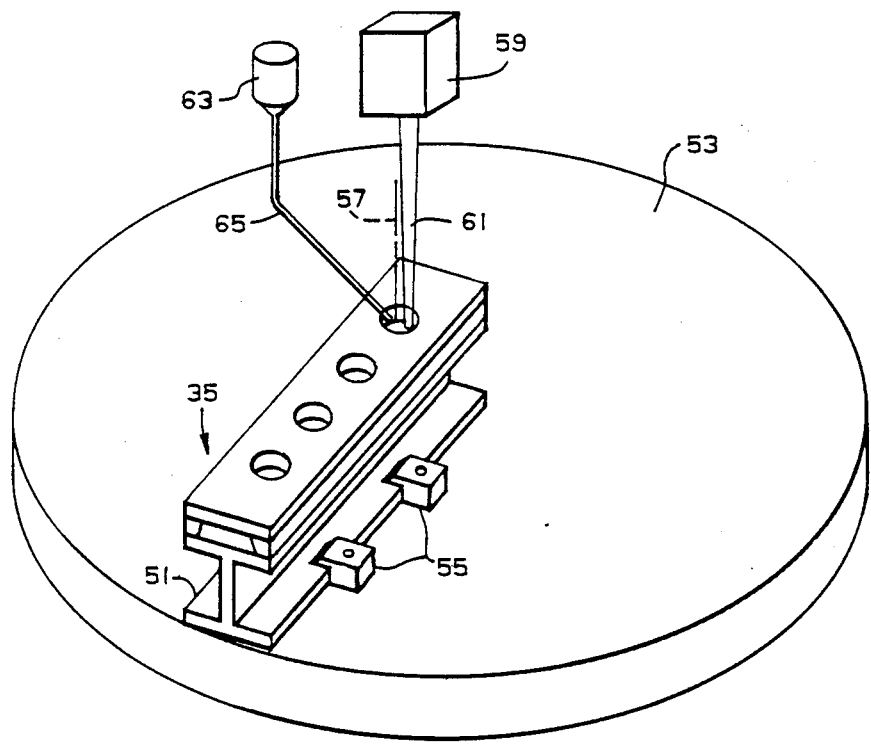
FIG. 5 is an isometric view of a set-up in accordance with the invention in which the fixture of FIG. 4 is mounted to produce the article of FIG. 3.

FIGS. 4 and 5 illustrate a set up for forming the bosses 33 around the bores 31 in the plate 27. FIG. 4 is a cross section through a fixture 35 which includes a bottom plate member 37, edge plate members 39 beveled to match the beveled edges on the plate 27, and a top plate member 41. The top plate member 41 is a guide member which has a series of bores 43 aligned with, but larger in diameter than, the bores 31 in the steel plate 27. These bores 43 form with the steel plate 27 cavities 45 in which the bosses 33 are formed.

The plate members 37, 39, 41 are secured together to encase the steel plate 27 by bolts 47 which secure the fixture 35 to a flange 49 on an I-beam 51. The I-beam 51, in turn, is clamped onto a rotatable table 53 by clamps 55 so that the center of one of the bores 31 in the steel plate 27 is aligned with the rotational axis 57 of the table. A laser beam generator 59 generates a laser beam 61 which is offset from the rotational axis 57 of the table 53 by the radius of the boss 33 to be formed as shown in FIG. 4. Powder metal 7 is fed from a supply 63 through a tube 65 into the cavity 45. As the table 53 revolves, successive layers of the boss 33 are built up in the manner discussed above. The cavity 45 confines the powder metal 7 to the vicinity of the boss 33 being formed, but it is the powder metal, not the cavity, which forms a mold for the boss as can be seen from the plan view of FIG. 6. As each boss 33 is completed, the clamps 55 are released and the I-beam 51 is indexed to align the next bore 31 with the rotational axis 57 of the table 53.

The fixture 35 made up of the plate members 37, 39 and the guide member 41 not only firmly secures the steel plate 27 for precise alignment, but also serves as a heat sink to conduct heat generated by the laser beam 61 away from the steel plate 27 to prevent it from warping. To this end, the members are made of a material with good heat conductivity, such as copper.

EXAMPLES

Figure 6:
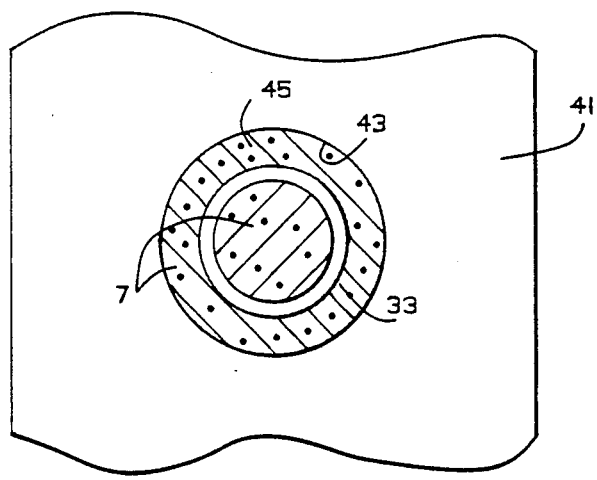
FIG. 6 is a plan view of a portion of the fixture of FIG. 4.

The set up of FIGS. 4 and 5 was used to form bosses on a carbon steel plate from several cobalt base (e.g. Stellite 6 and 12, and Triboloy 800), iron base (e.g. 410 and 422 stainless steel) and nickel base (e.g. Triboloy 700) alloy powders. The energy beam source was a 15 kw, carbon dioxide, continuous wave laser. The carbon steel plate with ⅜ inch diameter holes was rotated at 10 revolutions per minute, powder was fed into the cavity, and then the laser beam, with 4 kw of delivered power, was switched on. Continuous rotation of the table enabled a hollow cylindrical boss to be built up having the approximate dimensions of ¾ inch inside diameter, 3/16 inch wall thickness and ½ inch height in approximately 10 revolutions, or one minute of time. A laser beam with 8 degrees of convergence was used with a negative focal point elevation (below the top surface of the carbon steel plate) of about ½ inch. No adjustment of the optics was made during the build up process. The condition of defocus was such that, at the start of laser casting, penetration and melting of the substrate occurred, which served to anchor the boss with a metallurgical bond, but which did not cause excessive dilution of the boss material by the carbon steel plate. With increasing metal build up, the laser beam was consequently progressively defocused to a greater and greater extent. Adequate energy to cause additional buildup persisted only on the top surface of the boss. For test conditions, the average power density was approximately $5 \times 10^4$ watts/cm$^2$ and interaction time was about $3 \times 10^{-1}$ seconds. The unmelted loose powder, which surrounded the annular shaped boss peripherally and centrally as shown in FIG. 6, acted as a mold or die. It was not consumed in the laser casting and was recyclable.

Figure 7:
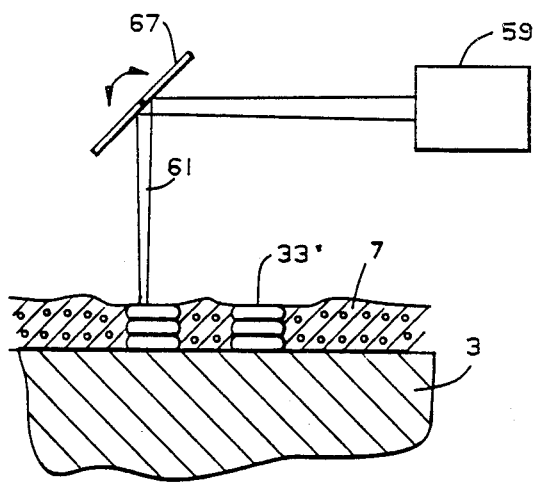
FIG. 7 is a schematic elevation view, partially in section, of another embodiment of the invention.

There is no limit on the outside or inside dimensions of hollow cylindrical articles made with the invention. By oscillating a final mirror 67, as indicated schematically in FIG. 7, wall thickness of the bosses 33'was increased from 3/16 inch up to ½ inch as the laser beam 61 scanned back and forth with rotation of the substrate.

Figure 8:
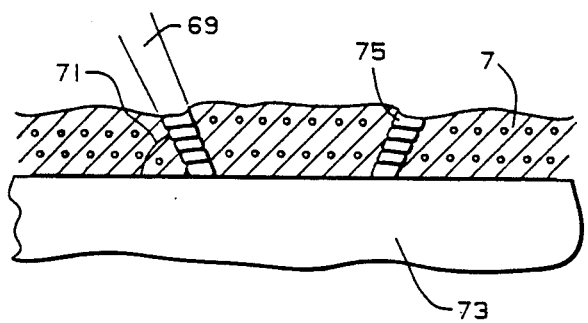
FIG. 8 is an elevation view, partially in section, of an additional embodiment of the invention.

Various shaped articles can be formed by varying the angle of incidence of the laser beam. For instance, with the laser beam 69 making an angle of less than 90 degrees with the substrate 73 as shown in FIG. 8, a flared article 75 can be formed. Obviously, by changing the angle of incidence 71 of the laser beam 69 during build up of the arricle 75, compound shapes can be formed. While the making of radially symmetrical articles has been illustrated, articles of numerous other geometric shapes could be formed by proper programming of the relative motion between the energy beam and the substrate. In each case, however, the laser beam should repetitively trace the shape of the article over the substrate so that the article is formed by the deposit of multiple layers of melted powder metal.

Figure 9:
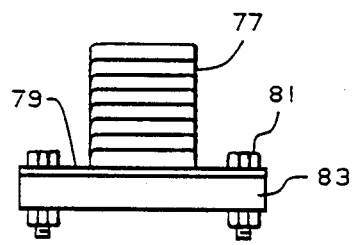
FIG. 9 is an elevation view of yet another embodiment of the invention.

The invention can also be used to form articles which are not permanently attached to a substrate. In such a case, the article can be formed on a substrate and cut free when completed. In another arrangement shown in FIG. 9, the article 77 can be formed on a thin substrate 79 of compatible material which is mechanically, such as by bolts 81, or otherwise, affixed to a support 83. The thin substrate 79 can then be removed, such as by milling, from the finished article. As an alternative, the article can be cast on a substrate which the melted powder does not adhere to readily so that the finished article can merely be broken free of the substrate.

If an electron beam is utilized as the energy source, the process must be carried out in a vacuum. If necessary, a cover gas can be used with the laser to prevent oxidation of the metal.

It is apparent from the foregoing description that the invention offers a number of advantages and economies over conventional casting of metal articles. Since the powder forms the mold or die for adding thick layers to the article, a considerable savings is realized in the fixtures required. In addition, sizable articles are formed quickly thus reducing labor costs. Since the unmelted powder is reusable, there is a considerable savings compared to wrought product costs.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A method of producing articles from powder metal comprising the steps of:
    generating a focused energy beam having an energy density sufficient to melt the powder metal;
    generating relative movement between the energy beam and a substrate such that the energy beam repetitively traces over the substrate the shape of said article and melts the surface of the substrate at the interface of the energy beam and the substrate; and
    feeding powder metal onto said substrate to maintain a depth of powder metal which laterally supports and forms a mold for a layer of powder metal at the energy beam interface which is melted by the energy beam, the thickness of the layer of powder metal being such that the energy beam penetrates the layer of powder metal and melts the surface of the substrate but only to the extent to wet the substrate sufficiently to bond to the substrate the melted powder metal, which in turn, cools rapidly upon leaving the energy beam interface to form a thick layer of the article which becomes the substrate for the next layer.

2. The method of claim 1 including the step of focusing the energy beam at a focal point beyond the surface of the substrare such that the energy beam is defocused at the substrate, and maintaining the focus constrant as successive layers of the article are built up.

3. The method of claim 2 including focusing the energy beam at a point beyond the surface of the substrate at a distance about equal to the height of the article to be built up.

4. The method of claim 3 including focusing the energy beam at a point about 0.5 inches beyond the surface of the substrate and adding successive layers to the article to build it up to the height of about 0.5 inches above the surface of the substrate.

5. The method of claim 1 including the step of focusing the energy beam at a focal point above the surface of the substrate such that the energy beam is defocused at the substrate and maintaining the focus constant as successive layers of the article are built-up, said focal point being sufficiently above the substrate such that the energy beam remains defocused at each successive layer.

6. The method of claim 1 wherein the step of feeding powder metal comprises feeding such powder metal at a rate which maintains a depth of powder metal over the substrate at the energy beam interface sufficient to form a layer of the article having a thickness greater than about 0.1 inches.

7. The method of claim 1 wherein the step of feeding powder metal comprises feeding such powder metal at a rate which maintains a depth of powder metal at the energy beam interface sufficient to form a layer of the article having a thickness of about 0.03 to 0.05 inches.

8. The method of claim 1 including the step of surrounding the base substrate at least partially with a heat sink member to conduct away from the base substrate heat produced by the energy beam, said heat sink member defining with the base substrate a cavity in which said article is produced, and wherein the step of feeding powder metal comprises feeding powder metal into said cavity to maintain a depth of powder metal which laterally supports and forms a mold for said layer of powder metal.

9. The method of claim 1 including the step of adjusting the angle of incidence of the energy beam on the substrate to control the shape of said article built up from layers of melted powder metal.

10. The method of claim 1 including separating the article made up of layers of melted powder metal from the base substrate.

11. The method of claim 1 including securing a thin base substrate to a support member, building up said article from layers of melted powder metal with said base substrate secured to said support member, and then separating said rhin base substrate from the support member and removing the base substrate from said article.

12. The method of claim 1 including providing a guide member having an opening which forms with the base substrate a cavity in which said article is formed, and wherein the step of feeding powder metal comprises feeding powder metal into said cavity at a rate to maintain a depth of powder metal which laterally supports and forms a mold for said layer of powder metal.

13. Apparatus for forming articles from powder metal comprising:
  means for generating a focused energy beam having an energy density sufficient to melt the powder metal;
  a base substrate;
  means for generating relative movement between the energy beam and the base substrate such that the interface of the energy beam with the base substrate repetitively traces the shape of said article over said base substrate;
  a guide member supported between the energy beam generating means and the base substrate and forming with the base substrate a cavity in which said article is formed; and
  means for feeding powder metal into said cavity to maintain a depth of powder metal in the cavity which laterally supports and forms a mold for a layer of powder metal at the energy beam interface which is melted by the energy beam, the thickness of the layer of powder metal being such that the energy beam penetrates the layer of powder metal and melts the surface of the base substrate, but only to the extent to wet the substrate sufficiently to bond to the substrate the melted powder metal, which in turn, cools rapidly upon leaving the energy beam interface to form a thick layer of the article which becomes the substrate for the next layer.

14. The apparatus of claim 13 including a support member and a fixture securing said base substrate to the support member, said fixture including said guide member and comprising heat conducting members in intimate contact with said base substrate to form a heat sink to conduct heat generated by the energy beam away from the base substrate.

* * * * *